United States Patent [19]

Yoneyama

[11] Patent Number: 5,701,386
[45] Date of Patent: Dec. 23, 1997

[54] RECORDING AND REPRODUCING APPARATUS AND METHOD FOR COMPRESSED VIDEO SIGNAL

[75] Inventor: Akira Yoneyama, Higashiosaka, Japan

[73] Assignee: Matsushita Electric Industrial Co., Ltd., Osaka-fu, Japan

[21] Appl. No.: 399,588

[22] Filed: Mar. 7, 1995

[30] Foreign Application Priority Data

Mar. 14, 1994 [JP] Japan .................................. 6-042498

[51] Int. Cl.⁶ .............................. H04N 5/917; H04N 5/91
[52] U.S. Cl. ................................... 386/909; 386/68
[58] Field of Search ........................... 358/342, 335, 358/310, 312, 311; 360/10.1, 10.3, 32, 33.1; 348/384, 426, 390; 386/109, 111, 112, 33, 27; H04N 5/917, 5/91

[56] References Cited

U.S. PATENT DOCUMENTS 5,426,463  6/1995  Reininger et al. ............... 348/405
5,502,493  3/1996  Meyer ............................ 348/426

OTHER PUBLICATIONS

Moving Picture Expert Group International Standard ISO/IEC Committee Draft 13818-2 (1993) "Generic Coding of Moving Pictures and Associated Audio".

Moving Picture Expert Group International Standard ISO/IEC 11172-2 (1993 E). "Information Technology—Coding of Motion Pictures and Associated Audio for Digital Storage Media at up to 1.5 Mbit/s".

Primary Examiner—Robert Chevalier
Attorney, Agent, or Firm—Greenblum & Bernstein P.L.C.

[57] ABSTRACT

A recording apparatus for recording a compressed video signal on a disc has an adder for adding the sequence header at the beginning of the corresponding sequence, and also adding a copy of the sequence header at a beginning of the final GOP in the corresponding sequence. The reproducing apparatus for reproducing the compressed video signal from a disc has a control for controlling the pick-up device such that under the fast reverse play mode, the pick-up device jumps backward over a copied sequence header when the pick-up device enters a new sequence from a rear end thereof, and reads the copied sequence header. Thus, the compressed video signal in the sequence can be reproduced without reading the sequence header provided at the beginning of the sequence.

16 Claims, 6 Drawing Sheets

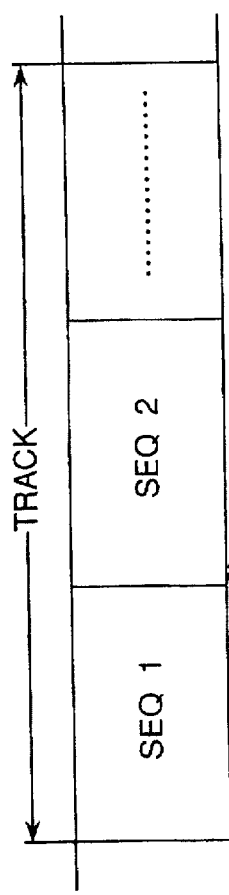
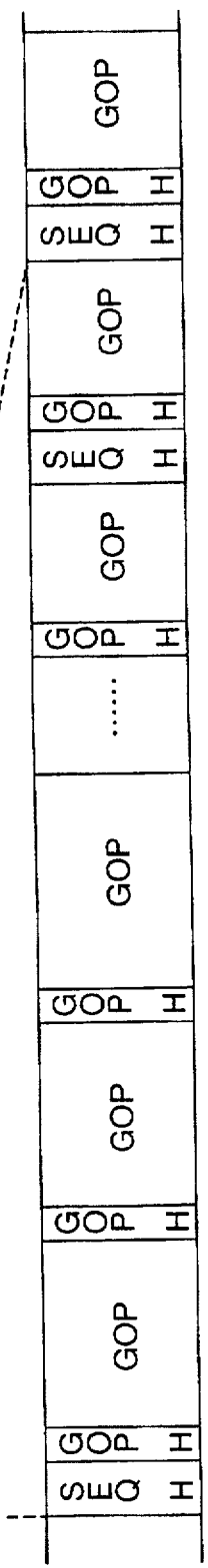
Fig.2A
Fig.2B

RECORDING AND REPRODUCING APPARATUS AND METHOD FOR COMPRESSED VIDEO SIGNAL

BACKGROUND OF THE INVENTION

1. Field of the Invention

The present invention relates to a recording and reproducing apparatus for recording and reproducing the compressed video signal, and also to a method thereof. The reproducing apparatus of the present invention is particularly capable for reproducing under fast reverse play mode.

2. Description of the Prior Art

Recently, a number of developments have been made to the technology of recording and reproducing compressed video signal under an MPEG standard (Moving Picture Expert Group). MPEG standards include ISO/IEC CD 13818 (a committed draft of the ISO/IEC; commonly known as MPEG-2), and ISO/IEC 11172 (an international standard of ISO/IEC; commonly known as MPEG-1). By the use of MPEG standard data compression, it is possible to record a relatively long period moving picture data in a compact disc (CD). For reproducing the recorded compressed video signal, the normal speed forward play mode is the main function of the reproducing apparatus, but other optional functions, such as a fast forward play mode and a fast reverse play mode, are in high needs.

According to the MPEG standard, the compressed video signal is obtained as follows. First, the video signal is separated into sequences, and each sequence is separated into GOPs (group of pictures). Then, the GOPs and the sequences are compressed. GOP headers intrinsic to the corresponding GOPs are generated, and also sequence headers intrinsic to the corresponding sequences are generated. Then, the GOP header is added at the beginning of the corresponding GOP, and the sequence header is added at the beginning of the corresponding sequence.

Thus, each sequence has a sequence header at its leading end and a number of GOPs following the sequence header. The sequence header carries various parameters necessary to expand the sequence. Each GOP includes a GOP header and a plurality pictures following the GOP header, such as I-picture (intra frame), B-picture (bidirectional interpolated frame) and P-picture (predictive frame), which are produced in a pattern I,B,B,P,B,B, repeatedly, as shown in FIG. 5. The I-picture includes one complete data for one frame and can reproduce one frame picture by itself using parameters from GOP header and sequence header. The B-picture includes data for one frame, but can not reproduce one frame picture by itself. Similarly, the P-picture includes data for one frame, but can not reproduce one frame picture by itself.

During the fast reverse play mode, the pick-up device which accesses the disc enters a new sequence from the rear end thereof. Thus, the data in the sequence is picked up without taking the sequence header. Thus, during the fast reverse play mode, no image will be reproduced.

SUMMARY OF THE INVENTION

The object of the present invention is therefore to provide recording and reproducing apparatus and method that can reproduce image even during the fast reverse play mode.

In order to achieve the aforementioned objective, according to the present invention, a recording apparatus comprises: separator means for separating a video signal into sequences, and each sequence into GOPs; compressor means for compressing said GOPs and said sequences; header generator means for generating GOP headers intrinsic to the corresponding GOPs, and sequence headers intrinsic to the corresponding sequences; and adding means for adding the GOP header at the beginning of the corresponding GOP, adding the sequence header at the beginning of the corresponding sequence, and also adding a copy of the sequence header within said corresponding sequence, but at a position other than said beginning of the corresponding sequence.

According to the present invention, a reproducing apparatus for reproducing a compressed video signal from a disc that has been recorded by the above described recording apparatus, comprises: pick-up drive means for driving a pick-up device for accessing a disc; reading means for reading compressed video signal picked up by said pick-up device; decoder means for decoding and expanding the compressed video signal from said reading means; and control means for controlling said pick-up drive means under a fast reverse play mode such that the pick-up device jumps backward over a copied sequence header when the pick-up device enters a new sequence from a rear end thereof, and reads the copied sequence header.

According to the present invention, a recording method comprises the steps of: separating a video signal into sequences, and each sequence into GOPs; compressing said GOPs and said sequences; generating GOP headers intrinsic to the corresponding GOPs, and generating sequence headers intrinsic to the corresponding sequences; and adding the GOP header at the beginning of the corresponding GOP, adding the sequence header at the beginning of the corresponding sequence, and also adding a copy of the sequence header within said corresponding sequence, but at a position other than said beginning of the corresponding sequence.

According to the present invention, a reproducing method for reproducing a compressed video signal from a disc that has been recorded by the above described recording method, comprises the steps of: driving a pick-up device for accessing a disc; reading compressed video signal picked up by said pick-up device; decoding and expanding the compressed video signal from said reading means; and controlling said pick-up device under a fast reverse play mode such that the pick-up device jumps backward over a copied sequence header when the pick-up device enters a new sequence from a rear end thereof, and reads the copied sequence header.

BRIEF DESCRIPTION OF THE DRAWINGS

These and other objects and features of the present invention will become clear from the following description taken in conjunction with the preferred embodiments thereof with reference to the accompanying drawings throughout which like parts are designated by like reference numerals, and in which:

FIGS. 2A and 2B are diagrams showing patterns of the compressed video signal as obtained by the recording apparatus of FIG. 1;

DETAILED DESCRIPTION OF THE PREFERRED EMBODIMENTS

Figure 1:
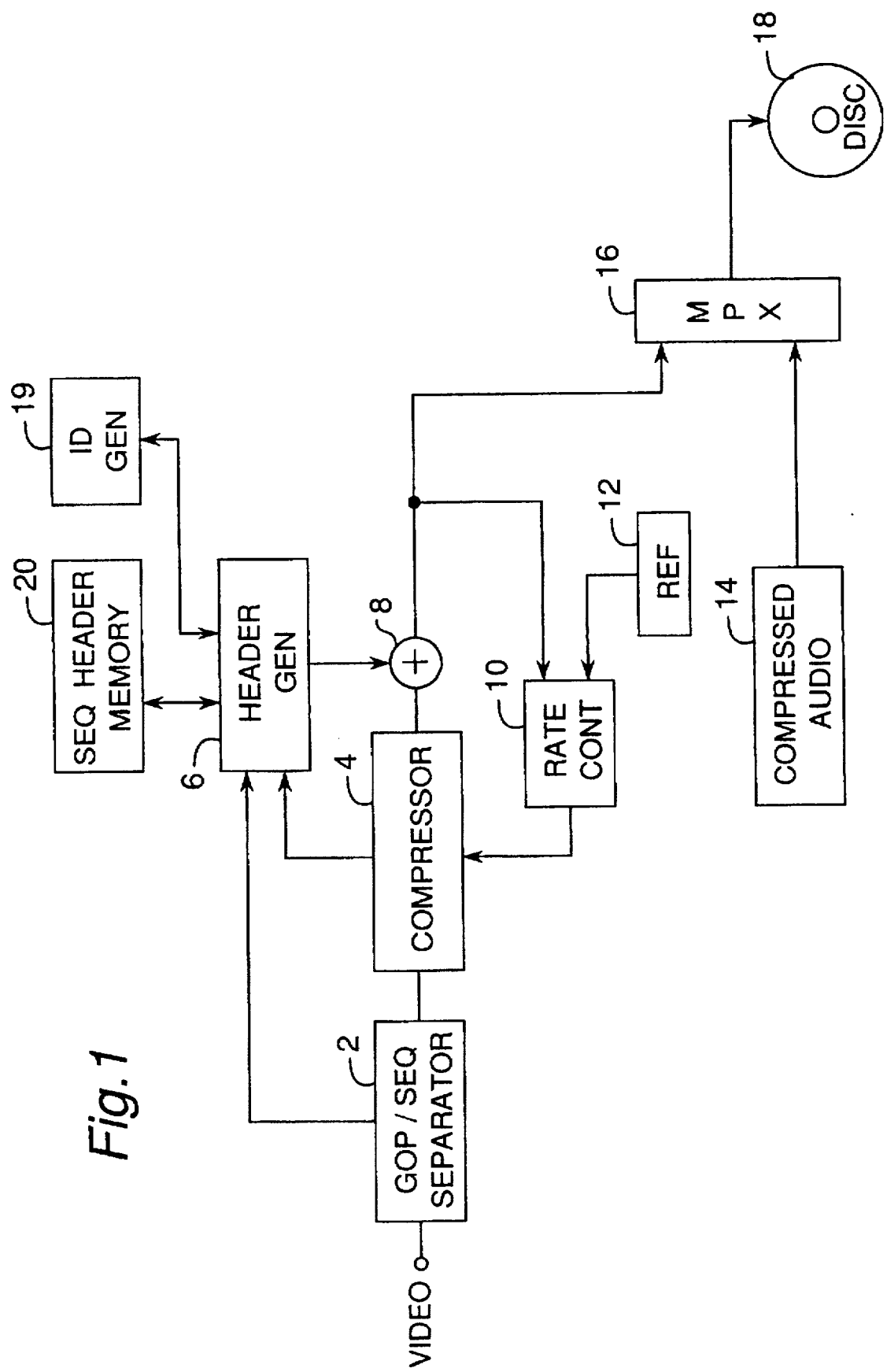
FIG. 1 is a block diagram of a recording apparatus according to the present invention.

Referring to FIG. 1, a block diagram of a recording apparatus for recording compressed video signal of moving picture according to the present invention is shown. In the figure, the video signal is applied to a GOP/SEQ separator 2 which separates the video signals into a number of sequences, and each sequence into a number of GOPs (group of pictures). One sequence may be one song if the data for storing in the disc is a number of songs. Each sequence is divided into a number of GOPs. The positions where the sequences are separated and where the GOPs are separated are given to a header generator 6 at which sequence headers and GOP headers are generated. The video signal from the separator 2 is applied to a compressor 4 which carries out the data compression, such as according to MPEG standard (Moving Picture Expert Group). MPEG standards include ISO/IEC CD 13818 (a committed draft of the ISO/IEC; commonly known as MPEG-2), and ISO/IEC 11172 (an international standard of ISO/IEC; commonly known as MPEG-1). The compression parameters, such as quantization matrix data, for each sequence and each GOP are given to header generator 6, so that such parameters are inserted in the respective headers. The sequence header as generated from the header generator 6 is inserted at the beginning of each sequence, and the GOP header is inserted at the beginning of each GOP, as shown in FIG. 2B.

It is noted that when playing the disc, it is necessary to first read the sequence header to expand and reproduce the compressed video data following that sequence header in that sequence. Also, it is necessary to first read the GOP header to expand and reproduce the data following that GOP header in that GOP. Each GOP includes the GOP header and a number of pictures as explained below.

Figure 5:
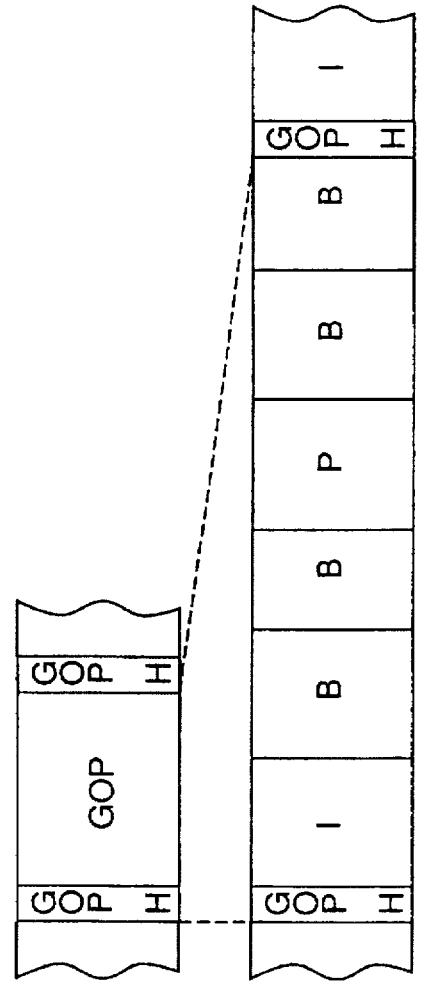
FIG. 5 is a block diagram of compressed video signal, particularly showing the detail thereof.

Each GOP has an I-picture (intra frame), B-picture (bidirectional interpolated frame) and P-picture (predictive frame), which are produced in a pattern I,B,B,P,B,B, repeatedly, as shown in FIG. 5. The I-picture includes one complete data for one frame and can reproduce one frame picture by itself. The B-picture includes data for one frame, but can not reproduce one frame picture by itself. Similarly, the P-picture includes data for one frame, but can not reproduce one frame picture by itself. Thus, the I-picture can be considered as an independent frame that can reproduce by itself, and B-picture and P-picture can be considered as a dependent frame that requires to make reference of other frame. This is further explained below.

In the moving picture, the image of the present frame and the image of the next frame are very similar, only a small change is observed due to the change of the moving element. In the I-picture, one complete data for one frame is provided, so that one frame picture can be produced by the data in the I-picture only. The P-picture is a data representing a difference between the picture data in the I-picture and the picture data in the P-picture, in the same GOP. The B-picture is a data representing a combination of a difference between the picture data in the I-picture and the picture data in the B-picture, and a difference between the picture data in the P-picture and the picture data in the B-picture, all in the same GOP. Therefore, to reproduce the P-picture, it is necessary to use the data in the I-picture, and to reproduce the B-picture, it is necessary to use the data in the I-picture and B-picture. However, to reproduce the I-picture, no referencing is required, I-picture can reproduce by itself.

It is noted that even with the I-picture, it is necessary to use the corresponding GOP header data and the corresponding sequence header data which have various parameters to expand the I-picture.

Referring back to FIG. 1, a rate control 10 is connected between the out of adder 8 and compressor 4 for controlling the compression rate to be substantially equal to a predetermined rate given by a reference generator 12. Thus, adder 8 produces a bit stream of compressed video data, as shown in FIG. 2B. The compressed video data from adder 8 is applied to a multiplexer 16 which also receives a compressed audio data from compressed audio data generator 14. The multiplexer 16 inserts the compressed audio data in the compressed video data such that the audio data of one sector period is inserted ever after three sector periods of video data. Thereafter, the compressed video/audio data is written on a disc 18.

According to the present invention, a sequence header memory 20 is coupled to the header generator 6 to hold the sequence header so that the same sequence header as that added at the beginning of each sequence is also added immediately before adding the GOP header for the final GOP in that sequence. Thus, the sequence header memory 20 holds the sequence header at least until the GOP header for the final GOP in that sequence is added in the adder 8. Thus, according to the present invention, a copy of the sequence header is inserted immediately before the GOP header of the final GOP in that sequence, as shown in FIG. 2B.

According to the present invention, an ID generator 19 is provided to generate an identification data (ID data) indicating that the compressed video data has one or more copy of the sequence header inserted somewhere in each sequence.

Figure 3:
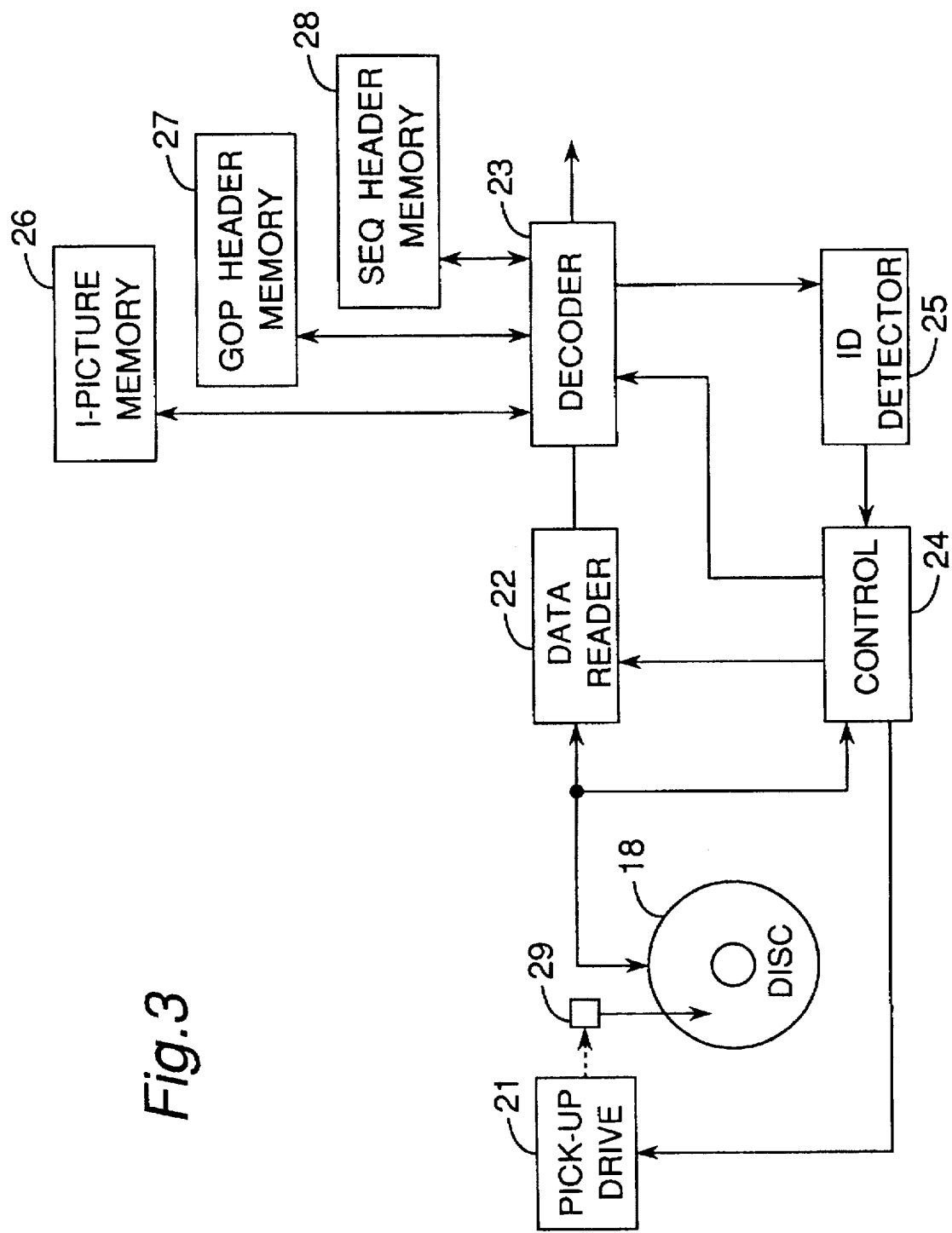
FIG. 3 is a block diagram of a reproducing apparatus according to the present invention.

Referring to FIG. 3 a block diagram of a reproducing apparatus for reproducing the compressed video signal of moving picture according to the present invention is shown. In the figure, the data stored in the disc 18 is picked-up by a known pick-up device 29 which is operated by a pick-up drive 21. The picked-up data is applied to a data reader 22 and also to a control 24. The data reader 22 separates the compressed video data and compressed audio data and sends the bit stream of only the compressed video data to a decoder 23. Decoder 23 expands the compressed video signal and reproduces the video signal. Decoder 23 is coupled with an I-picture memory 26, a GOP header memory 27 and a sequence header memory 28. An ID detector 25 detects the ID data from the video data and informs the control 24 of the detected result, i.e., the fact that the compressed video data has one or more copy of the sequence header inserted in each sequence.

Figure 4:
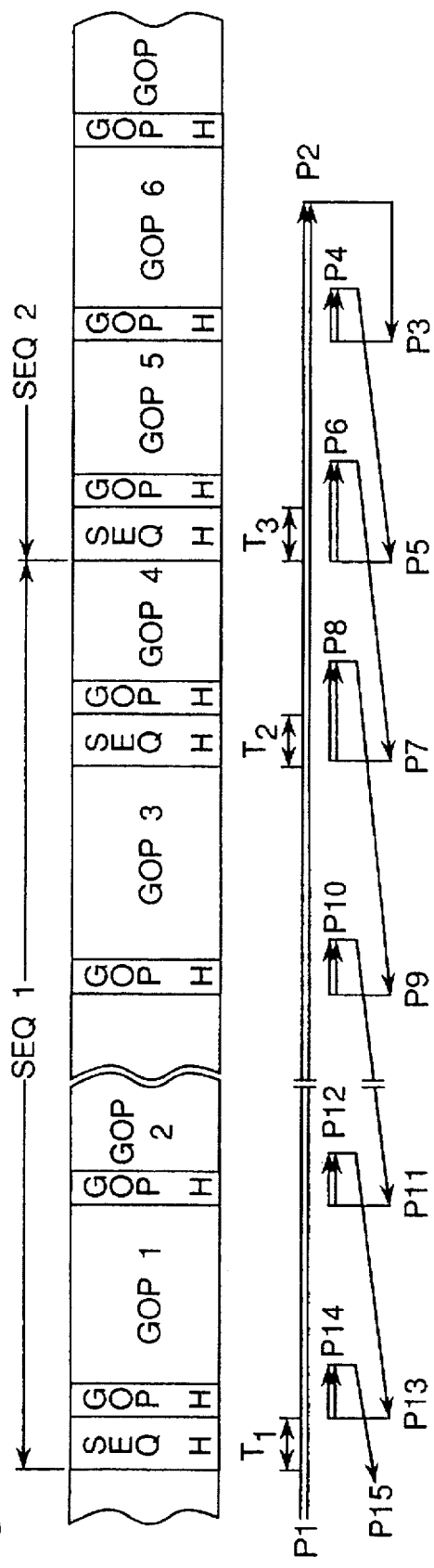
FIG. 4 is a block diagram of compressed video signal, and particularly showing movement patterns of the pick-up device.

When the ID data is detected by ID detector 25, control 24 is enable to carrying out a reverse play according to the present invention. In FIG. 4, a long double line arrow from P1 to P2 represents the movement of the pick-up device 29 under the forward play mode, and the combination of single line arrows and intermittent short double line arrows from P2 to P15 represents the movement of the pick-up device 29 under the fast reverse play mode. First the forward play is briefly explained.

During the forward play, the pick-up device 29 reads the data on track in the forward direction. When the sequence header for sequence SEQ1 is detected at a period T1, the parameters collected from the sequence header are stored in the sequence header memory 28 and used for reproducing the pictures in the sequence SEQ1. The parameters from the GOP header are stored in GOP header memory 27, and are renewed whenever a new GOP header is detected. Then, at a period T2, the same sequence header is detected, so no parameter change is effected at this point. Next, at a period T3, a new sequence header for sequence SEQ2 is detected. Thus, the parameters as stored in the sequence header memory 28 are changed to new parameters for sequence SEQ2. Then, after reproducing a number of pictures in sequence SEQ2, the forward play is stopped at position P2 by the user's operation.

Thereafter, it is assumed that the user selects a fast reverse play mode. Thus, the control 24 operates the pick-up drive 21 such that the pick-up device 29 jumps backward from the present position P2 to P3, i.e., to the very beginning point of the GOP header for GOP6.

Then, starting from point P3, the forward play mode is effected up to point P4 for reading the GOP header and the I-picture in GOP6 which is located next to the GOP header, as shown in FIG. 5. Thus, one frame of I-picture is stored in I-picture memory 26, and at the same time, it is reproduced on a screen (not shown). In this case, since the parameters for the sequence SEQ2 is already stored in the sequence header memory 28, the I-picture can be reproduced properly.

After one frame is reproduced, the pick-up device jumps backward again and lands at a point P5 immediately before the sequence SEQ2. During the backward jump, the I-picture is reproduced repeatedly by reading the I-picture data from I-picture memory 26, repeatedly. This continues until the next I-picture is detected.

Starting from point P5, the forward play mode is effected up to point P6 for reading the sequence header for sequence SEQ2, GOP header for GOP5 and I-picture. Thus, the parameters in the GOP header memory 27 and the data in the I-picture memory 26 are changed. The parameters in the sequence head memory 28 are not changed, because the parameters are the same as before. Then, the pick-up device 29 jumps backward again and lands at a point P7 immediately before the copied sequence header for sequence SEQ1. During the backward jump, the new I-picture from GOP5 is reproduced repeatedly.

Starting from point P7, the forward play mode is effected up to point P8 for reading the copied sequence header for sequence SEQ1, GOP header for GOP4 and I-picture. Thus, as the pick-up device 29 reads the sequence header, GOP header and I-picture, sequentially, the data in the sequence header memory 28, GOP header memory 27 and I-picture memory 26 are all changed to the parameters of the sequence header for sequence SEQ1, parameters of GOP header for GOP4 and a new I-picture from GOP4. Then, the pick-up device 29 jumps backward again and lands at a point P9 immediately before the GOP header for GOP3. During the backward jump, the new I-picture from GOP4 is reproduced repeatedly.

Starting from point P9, the forward play mode is effected up to point P10 for reading the GOP header for GOP3 and I-picture. Thus, as the pick-up device 29 reads the GOP header and I-picture, sequentially, the data in the GOP header memory 27 and I-picture memory 26 are changed to the parameters of the GOP header for GOP3 and a new I-picture from GOP3. Then, the pick-up device 29 jumps backward again and lands at a point immediately before the GOP header for one previous GOP. During the backward jump, the new I-picture from GOP3 is reproduced repeatedly.

As apparent from the above, according to the present invention, control 24 is so program to control the pick-up device 29 21 under the fast reverse play mode such that, the pick-up device 29 jumps backward over a copied sequence header when the pick-up device 29 enters a new sequence from the rear end thereof, and reads the sequence header, GOP header and I-picture; and when the pick-up device 29 jumps backward within the same sequence, the pickup-device jumps backward over a previous GOP header, and reads the GOP header and I-picture.

According to the present invention, the sequence header, which is usually provided at the front end of the sequence, is copied and inserted near the rear end of the sequence. Thus, it is possible to detect the sequence header even when the pick-up device 29 enters a new sequence from its rear end. Thus, the fast reverse play mode can be accomplished easily.

Figure 6A:
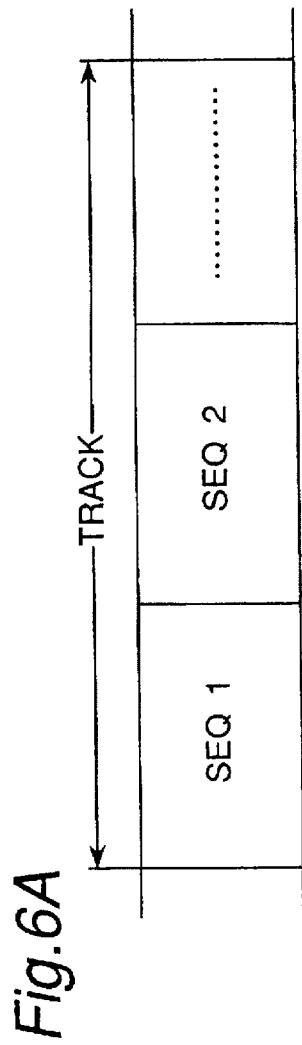
FIGS. 6A and 6B are views similar to FIGS. 2A and 2B, but showing a modification thereof.
Figure 6B:
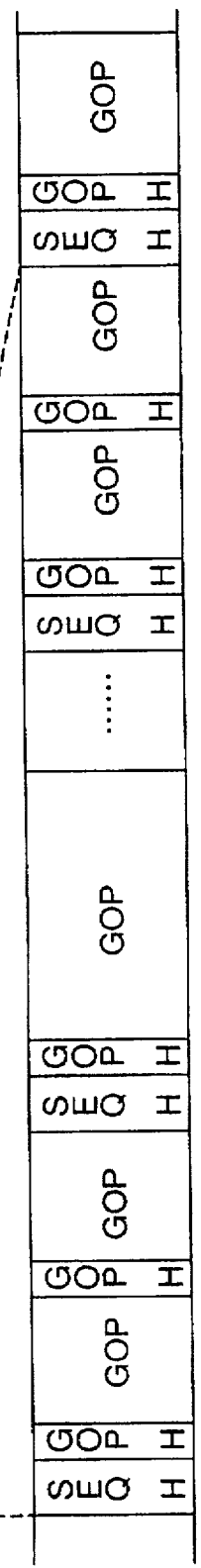
Figure 7A:
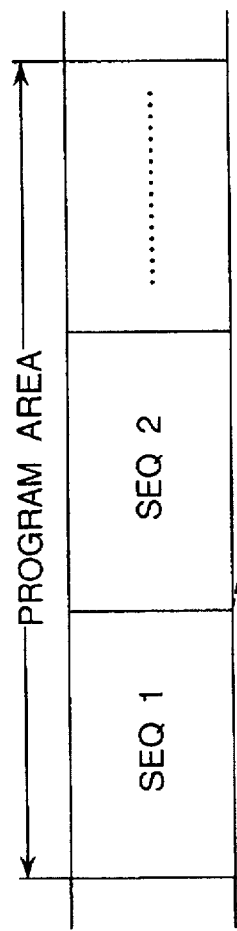
FIGS. 7A and 7B are diagrams showing patterns of the compressed video signal as obtained by the prior art recording apparatus.
Figure 7B:
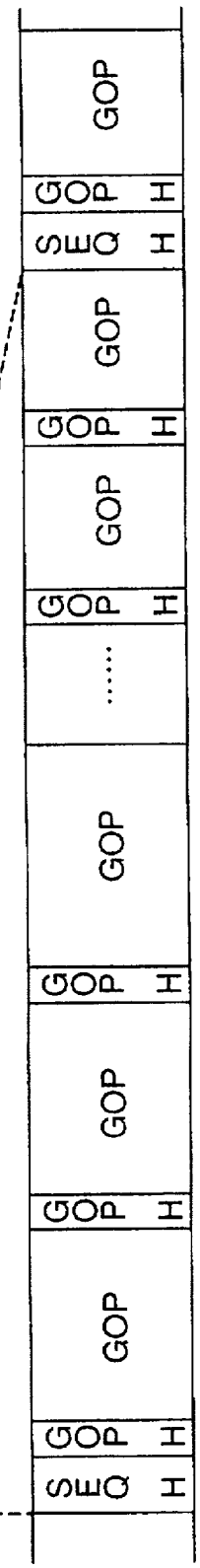

Referring to FIGS. 6A and 6B, a modification of the above described embodiment is shown. Instead of inserting the copy of the sequence header at the beginning of the final GOP, the copy of the sequence header may be inserted at the beginning of one or more GOPs in one sequence. In this case, the copy of the sequence header can be inserted at the beginning of the GOPs located intermediately in the sequence, such as the GOPs previously picked up and listed in a Table (not shown) for effecting the multiple fast forward/reverser play mode. Under the multiple fast forward/reverser play mode, the pick-up device 29 jump with a great span and steps on the GOPs listed in the Table. Since the GOPs listed in the Table have a copy of corresponding sequence header inserted in front of each GOP header, it is possible to reproduce the I-pictures that follows the listed GOPs.

Also, the copy of the sequence header can be inserted at the beginning of the final GOP and also at the beginning of one or more of the intermediate GOPs.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A recording apparatus for recording a compressed video signal on a disc, said compressed video signal being divided into a plurality of sequences with a sequence header inserted at a beginning of each sequence, each sequence being divided into a plurality of GOPs with a GOP header inserted at a beginning of each GOP, said recording apparatus comprising:

separator means for separating a video signal into said plurality of sequences, and for separating each sequence into said plurality of GOPs;

compressor means for compressing said plurality of GOPs and said plurality of sequences, said compressing means further comprising means for controlling a compression rate and a reference generator that determines a rate of compression by the compressor means;

header generator means for generating a GOP header intrinsic to a corresponding GOP of said plurality of GOPs, and for generating a sequence header intrinsic to a corresponding sequence of said plurality of sequences; and adding means for adding said GOP header at the beginning of said corresponding GOP, for adding said sequence header at the beginning of said corresponding sequence, and for also adding a copy of said sequence header at a beginning of at least a final GOP in said corresponding sequence.

2. The recording apparatus of claim 1, wherein said adding means adds said copy of said sequence header at a beginning of at least an intermediate GOP in said corresponding sequence.

3. The recording apparatus of claim 1, wherein said adding means adds said copy of said sequence header at a beginning of a final GOP and at a beginning of at least an intermediate GOP in said corresponding sequence.

4. A reproducing apparatus for reproducing a compressed video signal from a disc that has been recorded by said recording apparatus of claim 1, said reproducing apparatus comprising:

pick-up drive means for driving a pick-up device for accessing said disc;

reading means for reading said compressed video signal picked up by said pick-up device;

decoder means for decoding and expanding said compressed video signal from said reading means; and control means for controlling said pick-up drive means under a fast reverse play mode, such that said pick-up device jumps backward over a copied sequence header when said pick-up device enters a new sequence from a rear end thereof, and reads said copied sequence header.

5. The reproducing apparatus of claim 4, wherein each GOP comprises at least one I-picture which includes one complete data for one frame and can reproduce one frame picture by itself, and wherein said pick-up device reads, in addition to said copied sequence header, said GOP header and said I-picture.

6. The reproducing apparatus of claim 5, wherein said control means controls said pick-up drive means under a fast reverse play mode, such that said pick-up device jumps backward within the same sequence and over a previous GOP header, and reads said GOP and said I-picture.

7. The recording apparatus of claim 1, wherein said adding means adds said copy of said sequence header at a beginning of a final GOP and at a beginning of at least an intermediate GOP in said corresponding sequence.

8. A recording apparatus for recording a compressed video signal on a disc, said compressed video signal being divided into a plurality of sequences with a sequence header inserted at a beginning of each sequence, each sequence being divided into a plurality of GOPs with a GOP header inserted at a beginning of each GOP, said recording apparatus comprising:

separator means for separating a video signal into said plurality of sequences, and for separating each sequence into said plurality of GOPs;

compressor means for compressing said plurality of GOPs and said plurality of sequences, said compressing means further comprising means for controlling a compression rate and a reference generator that determines a rate of compression by the compressor means;

header generator means for generating a GOP header intrinsic to a corresponding GOP of said plurality of GOPs, and for generating a sequence header intrinsic to a corresponding sequence of said plurality of sequences;

adding means for adding said GOP header at the beginning of said corresponding GOP, for adding said sequence header at the beginning of said corresponding sequence, and for also adding a copy of said sequence header within said corresponding sequence at a position other than said beginning of said corresponding sequence; and identifier adding means for adding an identifier in said compressed video signal indicating that a copied sequence header is added.

9. A reproducing apparatus for reproducing a compressed video signal from a disc that has been recorded by said recording apparatus of claim 8, said reproducing apparatus comprising:

pick-up means for driving a pick-up device for accessing said disc;

reading means for reading said compressed video signal picked up by said pick-up device;

decoder means for decoding and expanding said compressed video signal from said reading means;

control means for controlling said pick-up drive means under a fast reverse play model such that said pick-up device jumps backward over a copied sequence header when said pick-up device enters a new sequence from a rear end thereof, and reads said copied sequence header; and identifier detector means for detecting said identifier.

10. A method for recording a compressed video signal on a disc, said compressed video signal being divided into a plurality of sequences with a sequence header inserted at a beginning of each sequence, each sequence being divided into a plurality of GOPs with a GOP header inserted at a beginning of each GOP, said recording method comprising the steps of:

separating a video signal into the plurality of sequences;

separating each sequence of the plurality of sequences into the plurality of GOPs;

controlling a rate of compression for compressing the plurality of GOPs and the plurality of sequences;

generating a GOP header intrinsic to a corresponding GOP of the plurality of GOPs;

generating a sequence header intrinsic to a corresponding sequence header of the plurality of sequences;

adding the GOP header at the beginning of the corresponding GOP;

adding the sequence header at the beginning of the corresponding sequence;

adding a copy of the sequence header within the corresponding sequence at a position other than the beginning of the corresponding sequence; and adding an identifier in the compressed video signal indicating that a copied sequence header is added.

11. A reproducing method for reproducing a compressed video signal from a disc that has been recorded by the recording method of claim 10, the reproducing method comprising the steps of:

driving a pick-up device for accessing the disc;

reading the compressed video signal picked up by the pick-up device;

decoding and expanding the compressed video signal from the reading means; and controlling the pick-up drive means under a fast reverse play mode, such that the pick-up device jumps backward over a copied sequence header when the pick-up device enters a new sequence from a rear end thereof, and reads the copied sequence header.

12. A recording apparatus for recording a compressed video signal on a disc, said compressed video signal being divided into a plurality of sequences with a sequence header inserted at a beginning of each sequence, each sequence being divided into a plurality of GOPs with a GOP header inserted at a beginning of each GOP, said recording apparatus comprising:

means for separating a video signal into said plurality of sequences, and for separating each sequence into said plurality of GOPs;

means for compressing said plurality of GOPs and said plurality of sequences;

means for generating a GOP header intrinsic to a corresponding GOP of said plurality of GOPs, and for generating a sequence header intrinsic to a corresponding sequence of said plurality of sequences;

means for adding said GOP header at the beginning of said corresponding GOP, for adding said sequence header at the beginning of said corresponding sequence, and for also adding a copy of said sequence header within said corresponding sequence at a position other than said beginning of said corresponding sequence; and means for adding an identifier to said compressed video signal indicating that a copied sequence header is added.

13. A reproducing apparatus for reproducing a compressed video signal from a disc that has been recorded by said recording apparatus of claim 12, said reproducing apparatus comprising:

means for driving a pick-up device for accessing said disc;

means for reading said compressed video signal with said pick-up device;

means for decoding and expanding said compressed video signal obtained by said reading means;

means for controlling said driving means under a fast reverse play mode, so that said pick-up device jumps backward over a copied sequence header when said pick-up device enters a new sequence from a rear end thereof, and reads said copied sequence header; and means for detecting said identifier added to said compressed video signal.

14. The reproducing apparatus of claim 13, wherein each GOP comprises at least one I-picture which includes data for one frame, and wherein said pick-up device reads, in addition to said copied sequence header, said GOP header and said I-picture.

15. The recording apparatus of claim 12, wherein said adding means adds said copy of said sequence header at a beginning of at least a final GOP in said corresponding sequence.

16. The recording apparatus of claim 12, wherein said adding means adds said copy of said sequence header at a beginning of at least an intermediate GOP in said corresponding sequence.

\* \* \* \* \*